(12) United States Patent
Ishigure

(10) Patent No.: US 10,656,632 B2
(45) Date of Patent: May 19, 2020

(54) MACHINING PROGRAM MANAGEMENT APPARATUS

(71) Applicant: FANUC CORPORATION, Yamanashi (JP)

(72) Inventor: Satoru Ishigure, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 42 days.

(21) Appl. No.: 15/813,325

(22) Filed: Nov. 15, 2017

(65) Prior Publication Data

US 2018/0150064 A1 May 31, 2018

(30) Foreign Application Priority Data

Nov. 25, 2016 (JP) .................................. 2016-229381

(51) Int. Cl.
G05B 19/418 (2006.01)
G05B 19/408 (2006.01)

(52) U.S. Cl.
CPC ....... G05B 19/4187 (2013.01); G05B 19/408 (2013.01); G05B 19/4183 (2013.01); G05B 19/41825 (2013.01); G05B 19/41835 (2013.01); G05B 2219/36043 (2013.01); G05B 2219/36051 (2013.01)

(58) Field of Classification Search
CPC .............. G05B 19/4187; G05B 19/408; G05B 19/4183; G05B 19/41825
USPC ........................................................ 700/159
See application file for complete search history.

(56) References Cited

U.S. PATENT DOCUMENTS

| 2008/0154399 | A1 | 6/2008 | Kaneko et al. | |
| 2010/0131084 | A1* | 5/2010 | Van Camp | G06F 8/65 700/86 |
| 2012/0179284 | A1* | 7/2012 | Nakamura | G05B 19/4068 700/160 |
| 2016/0162286 | A1* | 6/2016 | Bankole | G06F 8/71 717/170 |

FOREIGN PATENT DOCUMENTS

| CN | 101211171 A | 7/2008 |
| JP | H5-143136 A | 6/1993 |

(Continued)

OTHER PUBLICATIONS

Office Action in CN Application No. 201711172673.5, dated Sep. 29, 2018, 12 pp.

(Continued)

Primary Examiner — Robert A Cassity
(74) Attorney, Agent, or Firm — Hauptman Ham, LLP

(57) ABSTRACT

A machining program management apparatus is used for managing an alteration made to a machining program stored in a plurality of machine tools. The machining program management apparatus acquires, at predetermined intervals set in advance, a piece of machining program updating information including a last update date and time of the machining program stored in each machine tool, identifies a machining program to which an alteration is made, on the basis of the piece of machining program updating information, creates a piece of information on the alteration, and updates a piece of machining program information corresponding to the machining program to which the alteration is made.

5 Claims, 5 Drawing Sheets

(56) References Cited

FOREIGN PATENT DOCUMENTS

| | | | |
|---|---|---|---|
| JP | H5-224728 | A | 9/1993 |
| JP | H5-241640 | A | 9/1993 |
| JP | 2003-122412 | A | 4/2003 |
| JP | 2004-334859 | A | 11/2004 |
| JP | 2005-149194 | A | 6/2005 |
| JP | 2012-146109 | A | 8/2012 |

OTHER PUBLICATIONS

Notice of Allowance in JP Application No. 2016-229381, dated Apr. 17, 2018, 6pp.

* cited by examiner

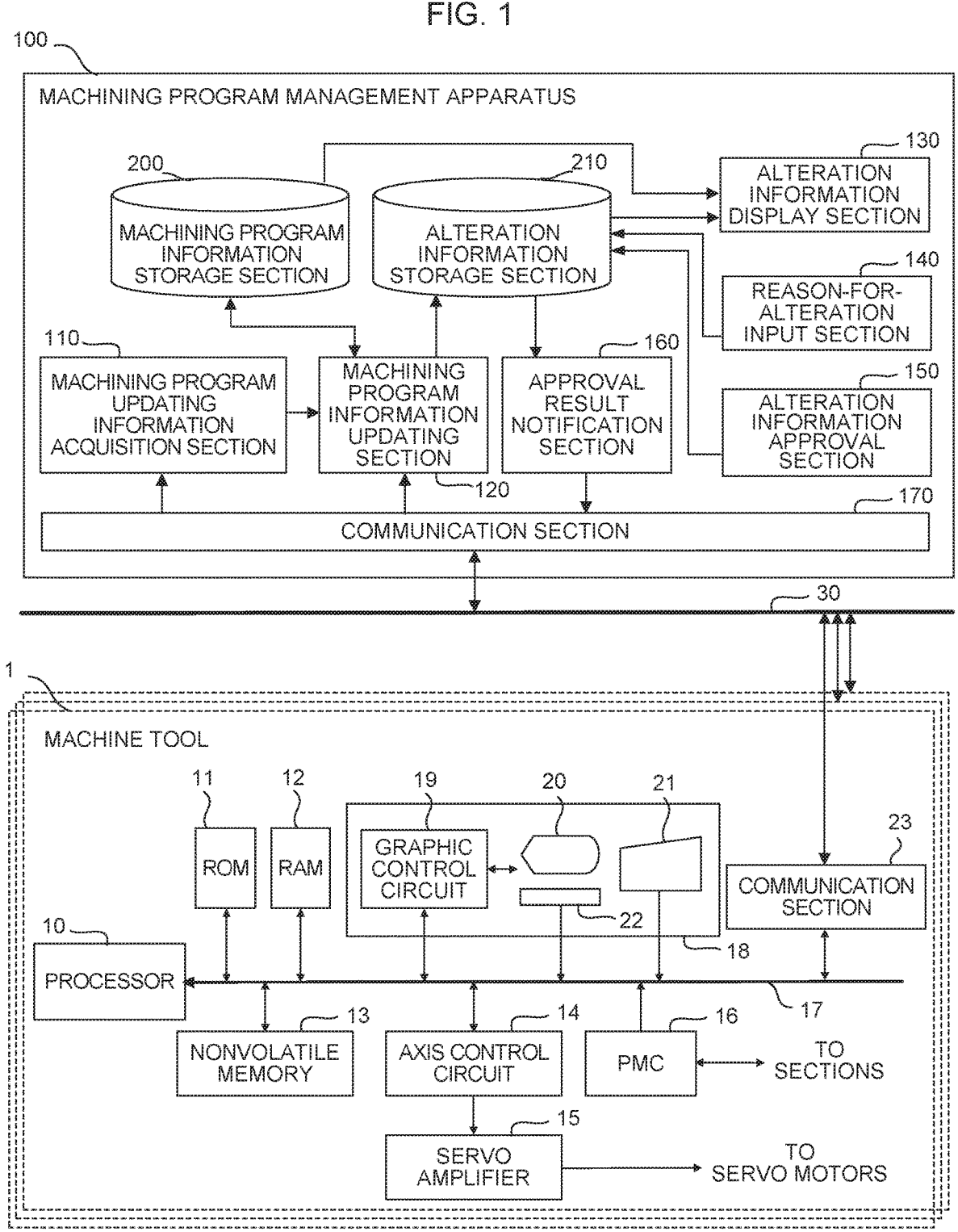

FIG. 2

MACHINING PROGRAM INFORMATION STORAGE SECTION

| MACHINE NAME | PROGRAM NAME | LAST UPDATE DATE AND TIME | MACHINING PROGRAM CONTENTS | LAST UPDATER | REMARKS |
|---|---|---|---|---|---|
| Machine 01 | O1000 | 2015/10/27 10:00 | ... | WORKER A | |
| Machine 01 | O2000 | 2015/10/27 10:00 | ... | WORKER A | |
| Machine 01 | O3000 | 2015/10/27 12:00 | ... | WORKER B | |
| Machine 01 | O4000 | 2015/10/27 13:00 | ... | WORKER A | |
| Machine 01 | O5000 | 2015/10/27 14:00 | ... | WORKER A | |
| Machine 02 | O0100 | 2015/10/23 11:00 | ... | WORKER C | |
| Machine 02 | O0200 | 2015/10/21 09:00 | ... | WORKER D | |
| Machine 02 | O0300 | 2015/06/21 09:00 | ... | WORKER C | |
| ... | ... | ... | ... | ... | ... |

 MATCHING PROCESS

MACHINING PROGRAM LIST INFORMATION

| MACHINE NAME | PROGRAM NAME | LAST UPDATE DATE AND TIME | |
|---|---|---|---|
| Machine 01 | O1000 | 2015/10/27 10:00 | |
| Machine 01 | O2000 | 2015/10/28 11:00 | O ALTERED |
| Machine 01 | O3000 | 2015/10/27 12:00 | |
| Machine 01 | O4000 | 2015/10/27 13:00 | |
| Machine 01 | O5000 | 2015/10/27 14:00 | |
| Machine 01 | O6000 | 2015/10/28 09:00 | O ADDED |
| Machine 02 | O0100 | 2015/10/23 11:00 | |
| Machine 02 | O0200 | 2015/10/21 09:00 | |
| ... | ... | ... | |

FIG. 3

ALTERATION INFORMATION STORAGE SECTION

| MACHINE NAME | PROGRAM NAME | TYPE | ALTERATION DATE AND TIME | APPROVAL STATUS | REASON FOR ALTERATION | DIFFERENCE INFORMATION | APPROVAL-RELATED COMMENT |
|---|---|---|---|---|---|---|---|
| Machine 01 | O1000 | CHANGE | 2015/10/26 09:00 | APPROVED | TOOL CHANGE | ... | |
| Machine 01 | O1000 | CHANGE | 2015/10/26 13:00 | APPROVED | SURFACE QUALITY IMPROVEMENT | ... | |
| Machine 01 | O1000 | CHANGE | 2015/10/27 09:00 | APPROVED | TOOL CHANGE | ... | |
| Machine 01 | O1000 | CHANGE | 2015/10/27 10:00 | UNAPPROVED | SURFACE QUALITY IMPROVEMENT | ... | |
| Machine 01 | O3000 | CHANGE | 2015/10/24 12:00 | APPROVED | SURFACE QUALITY IMPROVEMENT | ... | |
| Machine 01 | O3000 | ADDITION | 2015/10/27 12:00 | UNAPPROVED | HANDLING OF TEMPERATURE-INDUCED ERROR | ... | |
| Machine 01 | O4000 | CHANGE | 2015/10/27 13:00 | APPROVED | CHANGE OF TOOL USED | ... | |
| Machine 01 | O5000 | ADDITION | 2015/10/26 09:00 | APPROVED | HANDLING OF TEMPERATURE-INDUCED ERROR | ... | |
| Machine 01 | O5000 | DELETION | 2015/10/23 11:00 | APPROVED | ALTERATION CANCELLATION | ... | |
| Machine 02 | O0100 | ADDITION | 2015/10/27 15:00 | UNAPPROVED | FOR SHAPE CHANGE | ... | |
| ... | ... | ... | ... | ... | ... | ... | ... |

210

MACHINING PROGRAM MANAGEMENT APPARATUS

RELATED APPLICATIONS

The present application claims priority to Japanese Patent Application No. 2016-229381 filed on Nov. 25, 2016, the disclosure of which is hereby incorporated by reference herein in its entirety.

BACKGROUND OF THE INVENTION

1. Field of the Invention

The present invention relates to a machining program management apparatus, and especially relates to a machining program management apparatus capable of managing an alteration made to a machining program in a machine tool.

2. Description of the Related Art

A machining program is less likely to be used without change at the time of operating a machine tool on the basis of the machining program. In most cases, a machining program is used after a site worker makes an alteration to the machining program on site in accordance with, for example, an operating environment (temperature, humidity, and the like) for a machine tool, peculiarities of the machine tool, and the statuses of a workpiece and a tool to be used. The machining program alteration is commonly performed not only on an original machining program created in advance but also on a program altered at the time of previous machining operation, which is stored in a machine tool in question. For this reason, in an environment in a factory or the like where machining operation of a machine tool is daily performed, there are different versions of machining programs which are obtained by making an alteration to a machining program created in advance for each occasion when machining is performed or for each machine tool.

One example of a prior art technique which assists in machining program alteration is disclosed in Japanese Patent Application Laid-Open No. 2005-149194.

At a site in a factory or the like where a machine tool is operated, machining-program-based machining operation as described above is daily performed, and alterations made to a machining program are managed by periodically saving the machining program. If a product machined in accordance with a given machining program is found to have a defect (quality problem) as a result of checking the quality of the product, the cause is located by comparing the machining program with a machining program saved periodically. However, because an alteration is made to a machining program multiple times during machining, as described above, a machining program used to machine a product having a defect may not be identified. Even if the machining program is successfully identified, the time of alteration and the like may be unknown. Alternatively, an alteration (details of the alteration) made to a machining program before alteration may be unidentifiable, and the cause of the defect may be unanalyzable.

The above-described problems are found after appearance of the defect, and it is difficult to take proactive measures.

SUMMARY OF THE INVENTION

Under the above-described circumstances, an object of the present invention is to provide a machining program management apparatus capable of managing an alteration made to a machining program in a machine tool.

The present invention solves the above-described problems using the machining program management apparatus having a function of managing an alteration made to a machining program in a machine tool operated at a machining site.

The machining program management apparatus in the present invention detects that an alteration has been made to a machining program in a machine tool, extracts a difference between a program before alteration and a program after alteration, and records the difference as an edit log. The machining program management apparatus is configured such that a reason for change can be added to the recorded edit log or such that a manager viewing the edit log can approve an alteration in the edit log.

A machining program management apparatus according to the present invention is used to manage an alteration made to a machining program stored in at least one machine tool. The machining program management apparatus include: a machining program information storage section that stores machining program information, the machining program information being information on the machining program stored in the machine tool; an alteration information storage section that stores alteration information, the alteration information being information on an alteration made to the machining program; a machining program updating information acquisition section that acquires, at predetermined intervals set in advance, a piece of machining program updating information including a last update date and time of the machining program stored in the machine tool; a machining program information updating section that identifies a machining program, to which an alteration is made, on the basis of the machining program information stored in the machining program information storage section and the piece of machining program updating information, creates a piece of alteration information on the alteration and stores the piece of alteration information in the alteration information storage section; and updates a piece of machining program information corresponding to the machining program, to which the alteration is made, in the machining program information stored in the machining program information storage section; and an alteration information display section that displays the alteration information stored in the alteration information storage section. The machining program information includes at least contents of the machining program, and the machining program information updating section acquires the machining program, to which the alteration is made, from the machine tool, makes a comparison with the contents of the machining program included in the piece of machining program information corresponding to the machining program, to which the alteration is made, in the machining program information stored in the machining program information storage section and creates a piece of difference information, creates the piece of alteration information on the basis of the piece of difference information and stores the piece of alteration information in the alteration information storage section, and updates the machining program information stored in the machining program information storage section with contents of the machining program to which the alteration is made.

The machining program management apparatus can further include an alteration information approval section that sets a piece of approval information and/or a reason-for-alteration input section that sets a reason for alteration, for the alteration information stored in the alteration information storage section.

The alteration information display section may display a machining program before alteration and a machining program after alteration in a comparable form so as to discern a point of alteration between before and after alteration.

The machining program management apparatus can further include an approval result notification section that notifies the machine tool of the piece of approval information set for the alteration information.

According to the present invention, when an alteration is made to a machining program in a machine tool, a piece of information on the alteration together with an alteration time and the like are automatically put under management on the machining program management apparatus side. Upon appearance of a defect in a product, a machining program used for machining can be easily identified by a time of machining. Additionally, since the present invention allows reference to alteration details, a reason for alteration, and the like of a machining program in combination, the cause of a defect can be easily analyzed. In addition, since a manager or the like, checking in advance alteration details of an altered program, the alteration should be approved or not, it is possible to take proactive measures, such as stopping of use of the altered program.

BRIEF DESCRIPTION OF THE DRAWINGS

FIG. 1 is a schematic functional block diagram of a machining program management apparatus according to one embodiment of the present invention.

FIG. 2 is a chart for explaining a matching process to be executed by a machining program information updating section.

FIG. 3 is a chart illustrating alteration information stored in an alteration information storage section.

DETAILED DESCRIPTION OF THE PREFERRED EMBODIMENTS

Figure 4:
FIG. 4 is an example of an alteration information list display to be displayed by an alteration information display section.

FIG. 1 is a schematic functional block diagram of a machining program management apparatus according to one embodiment of the present invention and machine tools connected to the machining program management apparatus over a network.

A machining program management apparatus 100 is connected to one or more machine tools 1 over a wired/wireless network 30 and manages a machining program executed and altered by the machine tools 1.

The configuration of the machine tool 1 will be described first. The machine tool 1 having a numerical control function is centered around a processor 10. The processor 10 controls the entire machine tool 1 in accordance with a system program stored in a ROM 11. An EPROM or an EEPROM is employed as the ROM 11.

A DRAM or the like is employed as a RAM 12, which stores temporary computational data, display data, input and output signals, and the like. A CMOS or an SRAM which is backed up with a battery (not shown) is employed as a nonvolatile memory 13 to store a parameter, a machining program, tool offset data, and the like to be held after power-down. The nonvolatile memory 13 also stores log data (to be described later) related to the action of the machine tool 1.

A machine console panel 18 is arranged, for example, on a front surface of the machine tool 1 and is used to display data and graphics related to operation of the machine tool 1, accept manual operation input, data input, and the like from an operator, and operate the machine tool 1. A graphic control circuit 19 converts digital signals, such as numerical data and graphic data, into raster signals for display and sends the signals to a display device 20. The display device 20 displays numerical values and graphics. A liquid crystal display device is mainly employed as the display device 20.

An input device 21 is composed of a keyboard including a key switch, a rotary switch, a numerical key, a symbolic key, a character key, and a function key and a pointing device such as a mouse.

A touch panel 22 has a function of sensing an operator's operation, such as a touch or a drag. The touch panel 22 is overlaid and arranged on a screen of the display device 20. An operation performed by the operator on a software key, a software button, or a software switch displayed on the screen of the display device 20 can be sensed by the touch panel 22. Note that the touch panel 22 and the display device 20 may be combined into one device.

An axis control circuit 14 outputs an axis movement command to a servo amplifier 15 in response to the axis movement command from the processor 10. The servo amplifier 15 amplifies the movement command, drives a corresponding one of servo motors coupled to respective axes of the machine tool 1, and controls relative motion between a tool of the machine tool 1 and a workpiece. Although not shown in FIG. 1, each servo motor incorporates a position and speed detector, and a position and speed feedback signal from the position and speed detector is fed back to the axis control circuit 14. Note that although the axis control circuit 14 and the servo amplifier 15 for only one axis are shown in FIG. 1, the axis control circuits 14 and the servo amplifiers 15 are provided corresponding to the number of axes of the servo motors.

A programmable machine controller (PMC) 16 receives miscellaneous (M) function signals, spindle speed control (S) function signals, tool selection (T) function signals, and the like from the processor 10 via a bus 17. The PMC 16 processes these signals using a sequence program, outputs output signals, and controls the action and the like of pneumatic equipment, hydraulic equipment, an electromagnetic actuator, and the like inside and outside the machine tool 1. The PMC 16 also performs sequence processing in response to various signals from switches, sensors, and the like installed at sections inside the machine tool 1 and transfers necessary input signals to the processor 10 via the bus 17.

Note that a spindle motor control circuit, a spindle motor amplifier, and the like are not shown in FIG. 1.

The machine tool 1 is configured to be capable of communication with a different apparatus connected to the network 30, using a communication section 23. When information on a machining program stored in the nonvolatile memory 13 is requested from the outside, the communication section 23 sends pieces of information, such as the name of the machining program, the contents of the machining program, and a last update date and time of the machining program, in response to the request. A process of sending a piece of machining program information in response by the communication section 23 can be implemented using, for example, a conventional file sharing function.

The machining program management apparatus 100 according to the present embodiment includes a machining program updating information acquisition section 110, a machining program information updating section 120, an alteration information display section 130, a reason-for-alteration input section 140, an alteration information approval section 150, an approval result notification section 160, and a communication section 170. Note that these functional units are implemented through the action of a CPU which controls a ROM, a RAM, a nonvolatile memory, various input and output devices, and the like included in the machining program management apparatus 100.

The machining program updating information acquisition section 110 acquires a piece of machining program list information from each machine tool 1 over the network 30. The machining program updating information acquisition section 110 acquires, from each machine tool 1, a piece of information on a list of machining programs stored in the nonvolatile memory 13 of the machine tool 1. A piece of machining program list information to be acquired by the machining program updating information acquisition section 110 includes a piece of machining program updating information which is a combination of the machine name of the machine tool 1 as an acquisition request destination and the program name and the last update date and time of a machining program stored in the machine tool 1. The machining program updating information acquisition section 110 may identify the machine tool 1 as an object, from which a piece of machining program list information is to be acquired, on the basis of pieces of information (for example, network addresses) on machine tools as objects of management set in advance in a setting region (not shown) of the machining program management apparatus 100 or may broadcast to the network 30 and acquire a piece of machining program list information from the machine tool 1, from which a response is received. The machining program updating information acquisition section 110 may acquire a piece of machining program list information from each machine tool 1 at predetermined intervals set in advance (for example, intervals of 10 minutes) or may acquire a piece of machining program list information from each machine tool 1 upon receipt of an instruction from a user.

When the machining program updating information acquisition section 110 acquires a piece of machining program list information from each machine tool 1, the machining program updating information acquisition section 110 commands the machining program information updating section 120 to update machining program information stored in a machining program information storage section 200 and alteration information stored in an alteration information storage section 210.

The machining program information updating section 120 matches machining program list information acquired by the machining program updating information acquisition section 110 against the machining program information stored in the machining program information storage section 200 and updates the machining program information stored in the machining program information storage section 200 and the alteration information stored in the alteration information storage section 210, on the basis of a result of the matching. A piece of machining program information including at least a machine name, a program name, a last update date and time, and machining program contents can be stored in the machining program information storage section 200. Note that pieces of information, such as a last updater and remarks, may be included in the piece of machining program information.

The machining program information updating section 120 searches for, for each piece of machining program updating information included in the machining program list information, the machining program information stored in the machining program information storage section 200, using a combination of a machine name and a program name in the piece of machining program updating information. If a result of the search shows that a piece of machining program information corresponding to the combination of the machine name and the program name of the piece of machining program updating information is not stored in the machining program information storage section 200, the machining program information updating section 120 acquires a machining program from the machine tool 1 corresponding to the piece of machining program updating information over the network 30, creates a piece of machining program information on the basis of the acquired machining program, and adds the created piece of machining program information to the machining program information storage section 200.

If the result of the search shows that a piece of machining program information corresponding to the combination of the machine name and the program name of the piece of machining program updating information is stored in the machining program information storage section 200, the machining program information updating section 120 further compares a last update date and time included in the piece of machining program updating information with a last update date and time in the piece of machining program information retrieved from the machining program information storage section 200. If the last update date and time included in the piece of machining program updating information indicates a newer date and time than the last update date and time in the retrieved piece of machining program information, the machining program information updating section 120 judges that a machining program corresponding to the retrieved piece of machining program information has been altered on the machine tool 1 side and executes an alteration information creation process (to be described later).

FIG. 2 is a chart for explaining a matching process to be executed by the machining program information updating section 120.

A piece of machining program information according to the present embodiment can be uniquely identified by a combination of the machine name of the machine tool 1 storing a machining program and the program name of the machining program. In the example in FIG. 2, a piece of machining program information corresponding to a machining program "O2000" stored in a machine tool "Machine01" is stored in the machining program information storage section 200. Since a last update date and time ("2015/10/28 11:00" in the example in FIG. 2) included in a piece of machining program updating information included in the machining program list information indicates a date and time newer than a last update date and time ("2015/10/27 10:00" in the example in FIG. 2) stored in the machining program information storage section 200, the machining program "O2000" stored in the machine tool "Machine01" has been altered on the machine tool "Machine01", and a piece of machining program alteration information needs to be created. Since a piece of machining program information corresponding to a machining program "O6000" stored in the machine tool "Machine01" is not stored in the machining program information storage section 200, a piece of machining program information is created for a machining program newly added to the machine tool "Machine01".

When alteration of a machining program corresponding to a piece of machining program information stored in the machining program information storage section 200 on the machine tool 1 side is detected, the machining program information updating section 120 acquires the machining program from the machine tool 1 corresponding to a piece of machining program updating information over the network 30 and creates a piece of information on a difference produced by the alteration on the basis of the contents of the acquired machining program and contents of the piece of machining program information stored in the machining program information storage section 200 corresponding to the machining program. An algorithm for creating a piece of difference information for a common program, such as diff, may be used to create the piece of difference information. A piece of alteration information for the altered machining program is created on the basis of the created piece of difference information.

FIG. 3 is a chart showing an example of alteration information stored in the alteration information storage section 210.

The alteration information stored in the alteration information storage section 210 includes the machine name of the machine tool 1 storing a machining program, the program name of the machining program, an alteration date and time for an alteration to the machining program, the approval status of the alteration to the machining program, the reason for alteration to the machining program, and a piece of difference information between before and after the alteration to the machining program, and can further include pieces of information, such as the type of the alteration made to the machining program, indicating block addition, block deletion, or in-block element change, and a comment on approval of the alteration to the machining program. A piece of alteration information according to the present embodiment can be uniquely identified by a combination of the machine name of the machine tool 1 storing a machining program, the program name of the machining program, and an alteration date and time. One piece of alteration information is stored in the alteration information storage section 210 for one alteration made to a machining program. For this reason, for a machining program, to which a plurality of alterations have been made, a plurality of pieces of alteration information including the dates and times of the alterations are stored in the alteration information storage section 210.

After the machining program information updating section 120 creates a piece of alteration information as illustrated in FIG. 3 and stores the piece of alteration information in the alteration information storage section 210, the machining program information updating section 120 updates the last update date and time, the machining program contents, and the like of a piece of machining program information stored in the machining program information storage section 200, corresponding to an altered machining program.

Figure 5:
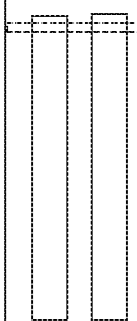
FIG. 5 is an example of a display of comparison between machining programs before and after alteration to be displayed by the alteration information display section.

The alteration information display section 130 displays the alteration information stored in the alteration information storage section 210 on a display device (not shown) which the machining program management apparatus 100 includes. FIGS. 4 and 5 show examples of an alteration information display by the alteration information display section 130.

As shown in, for example, FIG. 4, the alteration information display section 130 may display, for each of the machine names of the machine tools 1, most recent alterations made to respective machining programs stored in the machine tool 1 in list form or may display corresponding pieces of alteration information in list form by specifying an approval status (for example, unapproved, approved, or disapproved). Alternatively, alterations previously made to a specified machining program may be displayed in chronological order by specifying a program name. When an instruction is given to display a piece of difference information of a specific piece of alteration information on an alteration information list display screen ("Display" in the "Difference" field of each piece of alteration information is selected in the example in FIG. 4), the alteration information display section 130 may display the piece of difference information of the selected piece of alteration information, on the basis of the machining program information stored in the machining program information storage section 200 and the alteration information stored in the alteration information storage section 210, such that a point of alteration between before and after alteration can be easily discerned, as shown in FIG. 5.

In the display example in FIG. 5, a display position in the whole program is displayed in the upper left field, machining programs before and after alteration are displayed in comparable form in the upper right field, an altered block (altered blocks) is (are) highlighted (indicated by a dotted frame (dotted frames)), and a changed portion in a selected one of the block(s) highlighted in the upper right field is highlighted (indicated by a dotted frame) in the bottom field. Display by the alteration information display section 130 is not limited to the displays illustrated in FIGS. 4 and 5, and any other display method may be adopted as long as a user can accurately understand alteration details for a piece of alteration information.

The reason-for-alteration input section 140 inputs, for a piece of alteration information stored in the alteration information storage section 210, a reason for an alteration corresponding to the piece of alteration information. The reason for alteration which is input from the reason-for-alteration input section 140 is set for the specified piece of alteration information in the alteration information storage section 210. A reason for alteration which is input from the reason-for-alteration input section 140 is entered, for example, by a user referring to a piece of alteration information displayed by the alteration information display section 130 after the user judges to what end an alteration corresponding to the piece of alteration information is made. A person who has made an alteration may input a reason for alteration or a senior person, such as a manager, may input the reason for alteration.

The alteration information approval section 150 sets a piece of approval-related information, such as whether approved or disapproved, for an unapproved piece of alteration information of the alteration information stored in the alteration information storage section 210. A piece of approval-related information input from the alteration information approval section 150 is set for a specified piece of alteration information in the alteration information storage section 210. A piece of approval-related information input from the alteration information approval section 150 is entered by, for example, a user referring to a piece of alteration information displayed by the alteration information display section 130 after the user judges whether an alteration corresponding to the piece of alteration information is adequate, whether the alteration is without any problem, and the like. A senior person, such as a manager, or a skilled worker commonly enters a piece of approval-related information. A piece of accompanying information, such as an approval-related comment describing a reason for approval/disapproval or the like, may be set, in addition to a piece of approval-related information, such as whether approved or disapproved.

With the above-described configuration, alterations to a machining program made by a plurality of machine tools 1 are periodically collected into the machining program management apparatus 100 and are stored and managed as pieces of alteration information including an alteration date and time, a reason for alteration, and the like in the alteration information storage section 210. Additionally, since a piece of information related to approval of a piece of alteration information is managed together with the piece of alteration information, the adequacy of alteration details is recorded and can be used to investigate a cause upon appearance of a defect or the like.

The machining program management apparatus 100 according to the present embodiment may be configured to further include the approval result notification section 160. The approval result notification section 160 transmits a piece of information related to approval of an alteration to a machining program set by the alteration information approval section 150 and a piece of accompanying information related to approval to the machine tool 1 storing the machining program over the network 30. The machine tool 1 receiving the piece of information related to approval of the alteration to the machining program notifies a worker of the piece of information related to approval of the alteration (for example, whether approved or disapproved) and the piece of accompanying information related to approval through, for example, display on the display device 20. This allows cancellation of execution of a machining program having a disapproved alteration.

The embodiment of the present invention has been described above. The present invention, however, is not limited to the illustrated embodiment and may be carried out in various ways by making appropriate changes thereto.

The invention claimed is:

1. A machining program management apparatus for managing an alteration made to a machining program stored in at least one machine tool, the machining program management apparatus comprising:
at least one memory configured to
store machining program information, the machining program information being information on the machining program stored in the machine tool, and
store alteration information, the alteration information being information on an alteration made to the machining program, each of the machining program information and the alteration information stored in the memory including a machine name, a program name, and a last update date and time; and
a processor configured to
acquire, at predetermined intervals set in advance, a piece of machining program updating information including the last update date and time of the machining program stored in the machine tool,
identify a machining program, to which an alteration is made, on the basis of the machining program information stored in the at least one memory and the piece of machining program updating information,
create a piece of alteration information on the alteration,
store the piece of alteration information in the at least one memory,
update a piece of machining program information corresponding to the machining program, to which the alteration is made, in the machining program information stored in the at least one memory, and
cause a display to display the alteration information stored in the at least one memory, wherein
the machining program information includes at least contents of the machining program,
the processor is configured to
acquire the machining program, to which the alteration is made, from the machine tool,
make a comparison with the contents of the machining program included in the piece of machining program information corresponding to the machining program, to which the alteration is made, in the machining program information stored in the at least one memory to create a piece of difference information,
create the piece of alteration information on the basis of the piece of difference information and store the piece of alteration information in the at least one memory, and
update the machining program information stored in the at least one memory with contents of the machining program to which the alteration is made, and
the processor is configured to
check whether the acquired machining program updating information has been stored in the machining program information by referring to the machine name and the program name included in the machining program information and the alteration information, respectively,
in response to the acquired machining program updating information not having been stored in the machining program information, add the acquired machining program updating information to the machining program information, and
in response to the acquired machining program updating information having been stored in the machining program information, update the machining program information with the acquired machining program updating information and the machining program alteration information by referring to the last update date and time included in the machining program information and the alteration information, respectively.

2. The machining program management apparatus according to claim 1, wherein
the processor is configured to set a piece of approval information for the alteration information stored in the at least one memory.

3. The machining program management apparatus according to claim 1, wherein
the processor is configured to set a reason for alteration for the alteration information stored in the at least one memory.

4. The machining program management apparatus according to claim 1, wherein
the processor is configured to cause the display to display the machining program before alteration and the machining program after alteration in a comparable form so as to discern a point of alteration in the machining program before and after alteration.

5. The machining program management apparatus according to claim 1, wherein
the processor is configured to notify the machine tool of the piece of approval information set for the alteration information.

* * * * *